United States Patent [19]

Marshall

[11] Patent Number: 4,735,648
[45] Date of Patent: Apr. 5, 1988

[54] OPTICAL FIBRE MANUFACTURE

[75] Inventor: Andrew Marshall, Bishop's Stortford, United Kingdom

[73] Assignee: STC PLC, London, England

[21] Appl. No.: 940,232

[22] Filed: Dec. 11, 1986

Related U.S. Application Data

[63] Continuation of Ser. No. 757,963, Jul. 23, 1985, abandoned.

[30] Foreign Application Priority Data

Jul. 25, 1984 [GB] United Kingdom ............... 8418912

[51] Int. Cl.$^4$ ..................... C03C 17/02; C03C 25/02
[52] U.S. Cl. ..................... 65/3.12; 65/11.1; 65/18.1; 65/DIG. 16
[58] Field of Search ............ 65/3.12, 11.1, 18.1, 65/DIG. 16

[56] References Cited

U.S. PATENT DOCUMENTS

| | | | |
|---|---|---|---|
| Re. 30,883 | 3/1982 | Rau | 65/60.51 |
| 4,235,616 | 11/1980 | Siegfried | 6/3 A |
| 4,292,063 | 9/1981 | Abe | 65/18.1 X |
| 4,378,987 | 4/1983 | Miller et al. | 65/3.12 |
| 4,586,943 | 5/1986 | Kyoto et al. | 65/DIG. 16 |

FOREIGN PATENT DOCUMENTS

| | | |
|---|---|---|
| 0081282 | 6/1983 | European Pat. Off. . |
| 3037491 | 4/1981 | Fed. Rep. of Germany . |
| 2432478 | 2/1980 | France . |
| 0030852 | 3/1979 | Japan ..................... 65/3.12 |
| 0054939 | 3/1985 | Japan ..................... 65/DIG. 16 |

*Primary Examiner*—Arthur Kellogg
*Attorney, Agent, or Firm*—Lee, Smith & Zickert

[57] ABSTRACT

In an inside tube vapor phase deposition process for the production of doped silica glass by an oxidation reaction for optical fibre manufacture, in particular fluorine doped silica, the oxidation reaction is prevented from occurring until the reactant material, for example silicon tetrachloride and a fluorinating reagent, has been heated to a temperature above that required for the oxidation reaction. This preheating of the reactant material results in the oxidation reaction producing compositions of glasses which are not allowed from thermodynamic considerations at the lower temperature usually employed for the oxidation reaction, for example silica more highly doped with fluorine than hitherto achieved.

3 Claims, 3 Drawing Sheets

OPTICAL FIBRE MANUFACTURE

This application is a continuation of application Ser. No. 757,963, filed July 23, 1985 now abandoned.

This invention relates to optical fibre manufacture and in particular, but not exclusively, to vapour phase deposition processes for use in the production of doped silica glasses, such as for optical fibre cladding layers.

The dopant may be fluorine which significantly reduces the refractive index of silica.

According to one aspect of the present invention there is provided a vapour phase deposition process involving a glass forming reaction for the production of a doped glass from a reactant material, including the step of preventing the occurrence of the glass forming reaction until the reactant material has been heated to a temperature higher than that required for the glass forming reaction whereby to achieve the production of a doped glass of a composition not allowed from thermodynamic considerations at lower temperatures.

According to another aspect of the present invention there is provided a vapour phase deposition process for the production of a doped silica glass from an oxidation reaction of a reactant material comprising silicon tetrachloride and a reactant including the dopant, wherein the reactant material is heated to a temperature at which exchange reaction occurs between at least some of the silicon tetrachloride and the reactant including the dopant, which temperature is higher than that required for the oxidation reaction, and wherein the oxidation reaction is prevented from occurring until after the reactant material has been so heated whereby to achieve the production of a doped silica glass of a composition not allowed from thermodynamic considerations at lower temperatures.

According to a further aspect of the present invention there is provided an apparatus for use in inside tube vapour phase deposition of a doped glass by means of an oxidation reaction for the production of a preform for optical fibre manufacture, comprising means for rotatably supporting a substrate tube in use of the apparatus; means for heating a zone of the substrate tube oxidation reaction; means for traversing the heating means along the length of the substrate tube; vapour train means for generating reactant vapours; means for supplying the reactant vapours to the interior of the substrate tube, and means for supplying oxygen to the interior of the substrate tube, the reactant vapours supply means and the oxygen supply means being such that in use of the apparatus the oxidation reaction is prevented until after the reactant vapours have been heated to said temperature whereby to achieve the production of a doped glass of a composition not allowed from thermodynamic considerations at a lower temperature.

Embodiments of the invention will now be described with reference to the accompanying drawings, in which.

Figure 1:
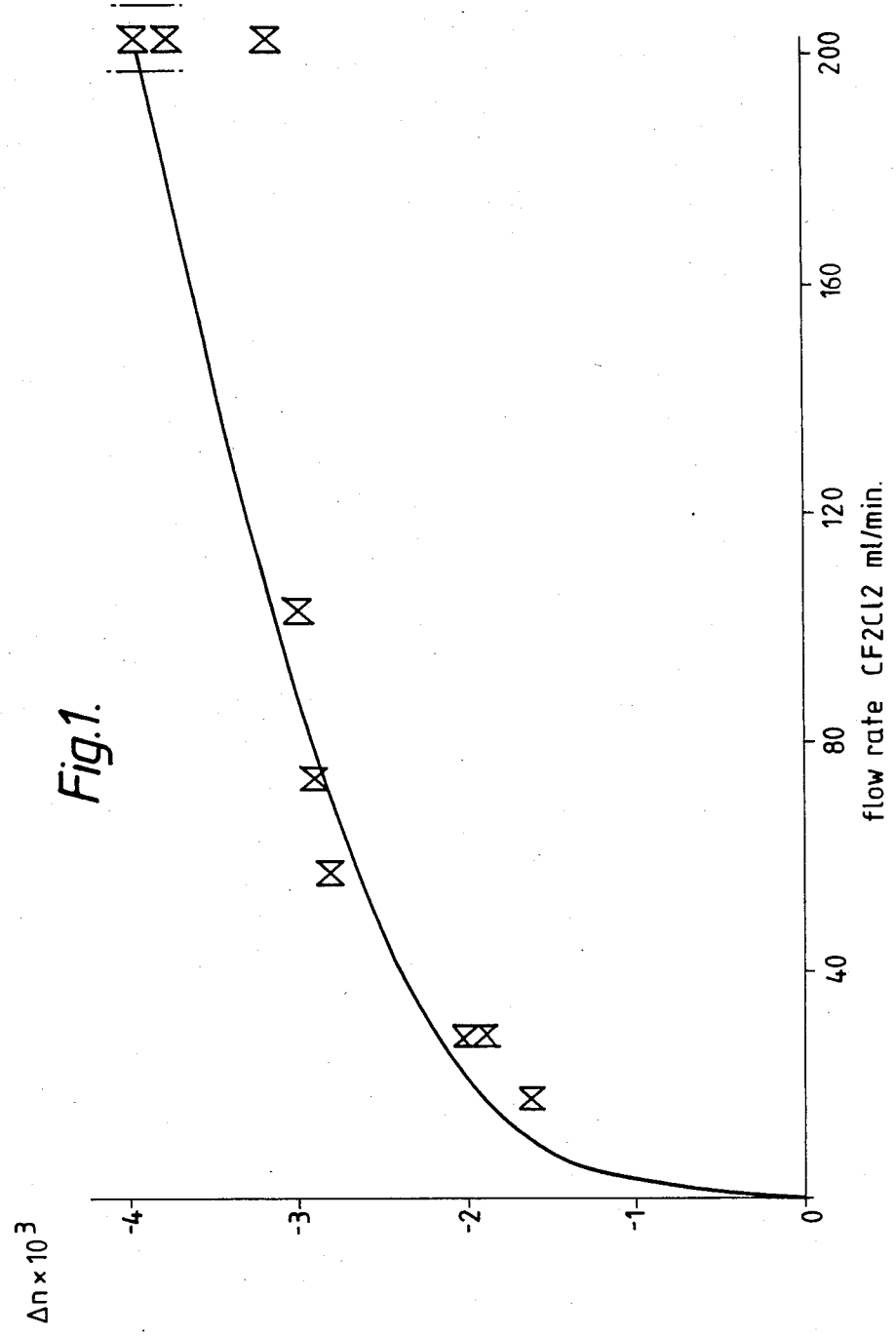
FIG. 1 illustrates a graph of Δn (refractive index depression) versus flow rate of $CF_2Cl_2$ as predicted by a computer model together with results achieved experimentally.

In the vapour deposition method for producing low loss optical fibres, layers of high purity glass are deposited on the inner wall of a silica substrate tube as the product of thermally initiated or plasma activated vapour phase reactions. The present invention is concerned with thermally initiated reactions. The silica substrate tube is extensively precleaned prior to mounting in a form of horizontal lathe. The interior of the tube is connected to the output of a vapour train which generates the required quantities of source reagent vapours. High purity halide source materials are vaporised and carried into the substrate tube with oxygen gas. There is no reaction under normal ambient conditions but at elevated temperatures, as produced by the flame of an oxy-hydrogen torch traversing along the length of the tube and directed thereat to produce a traversing hot zone, a chemical vapour phase reaction occurs to form a mixture of oxides which are simultaneously deposited and fused as a glassy layer to the inner wall of the substrate tube. By traversing the hot zone uniformally along the tube, a uniform deposit is built up.

Deposition reactions are of the form $$SiCl_4\ (g) + O_2\ (g) \rightarrow SiO_2\ (s) + 2Cl_2\ (g) \tag{1}$$

The deposition temperature required is a function of the fusion temperature of the deposited glass. Pure silica requires a temperature of 1900–2100K to be simultaneously deposited and fused, although the $SiCl_4 + O_2$ reaction can go to completion at 1200° C. ($\simeq$1500K). The deposition (with fusion) temperature reduces as the quantity of dopant increases. For doped silica a mixed oxide glass may be produced by introducing various dopants with the $SiCl_4$, for example $GeCl_4$ and $POCl_3$, in order to achieve a mixed oxide glass of $SiO_2$, $GeO_2$ and $P_2O_5$ for fibre core material, for example, or $BBr_3$ to achieve a $SiO_2/B_2O_3$ mixed oxide for a cladding layer on such a mixed oxide core. For fluorine doping of a cladding layer, therefore, the dopant source compounds $BBr_3$ in the above example, is replaced by a suitable F source material. After deposition of the initial optical cladding material e.g. $SiO_2/F$, the optical core is deposited, which may be solely $SiO_2$.

The coated tube is then collapsed into a rod preform by increasing the temperature of the hot zone to approximately 2100° C. (2400K) when surface tension forces cause the softening silica wall of the tube to collapse upon itself and eventually seal the interior hole. Traverse of the hot zone then continues the collapse along the whole tube to produce a rod preform which can then be pulled into a fibre.

Whereas the $SiCl_4 + O_2$ reaction is the most difficult of the $SiCl_4$, $GeCl_4$, $POCl_3$ and $BBr_3$ reactions, since the activation energy for the reaction is high and temperatures above 1400K are required to obtain appreciable reaction rates, the thermal decomposition of silicon tetrafluoride is difficult. The reaction $$SiF_4 + O_2 \rightarrow SiO_2 + 2F_2$$

is thermodynamically very unfavourable, 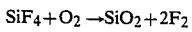 $\Delta G°_{2100}$, the standard free energy of reaction at 2100K (a typical reaction and deposition temperature) being +768KJ/mole, as opposed to −158KJ/mole for $SiCl_4 + O_2$, and Kp the equilibrium constant being vanishingly small and approximately zero, as opposed to 8512 for $SiCl_4+O_2$. ($\Delta G°_{2100}=-RTlnKp$). Some deposition occurs when silicon tetrachloride is mixed with the fluoride but oxidation to silica is considerably slower than for the chloride alone. (see for example J. Irven et al Optical Fibres by Plasma Augmented Vapour Deposition - Physics and Chemistry of Glass Vol 21 No. Feb. 1 1980 p 48). It has been postulated that the reaction proceeds via the formation of an intermediate chlorofluoro species e.g.

$$3\ SiCl_4 + SiF_4 \rightleftarrows 4\ SiCl_3F$$

for which $\Delta G°_{2100}$ is $+58$ kJ/mole and $Kp=0.036$, that is with a small but significant reaction in the forward direction. Then $$SiCl_3F + ^3/_2\ O_2\ (g) \rightarrow SiO_{1.5}F + ^3/_2\ Cl_2\ (g) \qquad (2)$$

where $SiO_{1.5}F$ represents a tetrahedrally bonded silicon with one fluorine and three bridging oxygen bonds. However little fluoride is incorporated even with large excesses of $SiF_4$.

A computer model based on thermodynamic predictions has shown good agreement with experimental data for the fluorination of silica in the inside tube vapour deposited silica process. The computer model was based on the idea that the principle mechanism of fluorine incorporation into silica based optical fibres is via reaction (2). The $SiCl_3F$ is generated via exchange reactions between $SiCl_4$ and fluorine or various fluorine containing reagents (e.g. $SiF_4$, $CF_2Cl_2$, $CF_4$, $SF_6$, $BF_3$) forming various proportions of all of the components of the $SiCl_{4-n}F_n$ ($n=0,1,2,3$ or 4) series. The model uses the fact that reaction (1) goes to completion at 1200° C. ($\simeq 1500K$) and the assumption that reaction (2) follows similar kinetics. FIG. 1 illustrates a graph of $\Delta n$ versus flow rate of $CF_2Cl_2$ as predicted by the computer model, experimental results being marked thereon showing good agreement therewith and thus tending to confirm that $SiCl_3F$ is the prime precursor to fluorinated glass. ($\Delta n$ is the refractive index depression relative to pure silica).

Figure 2:
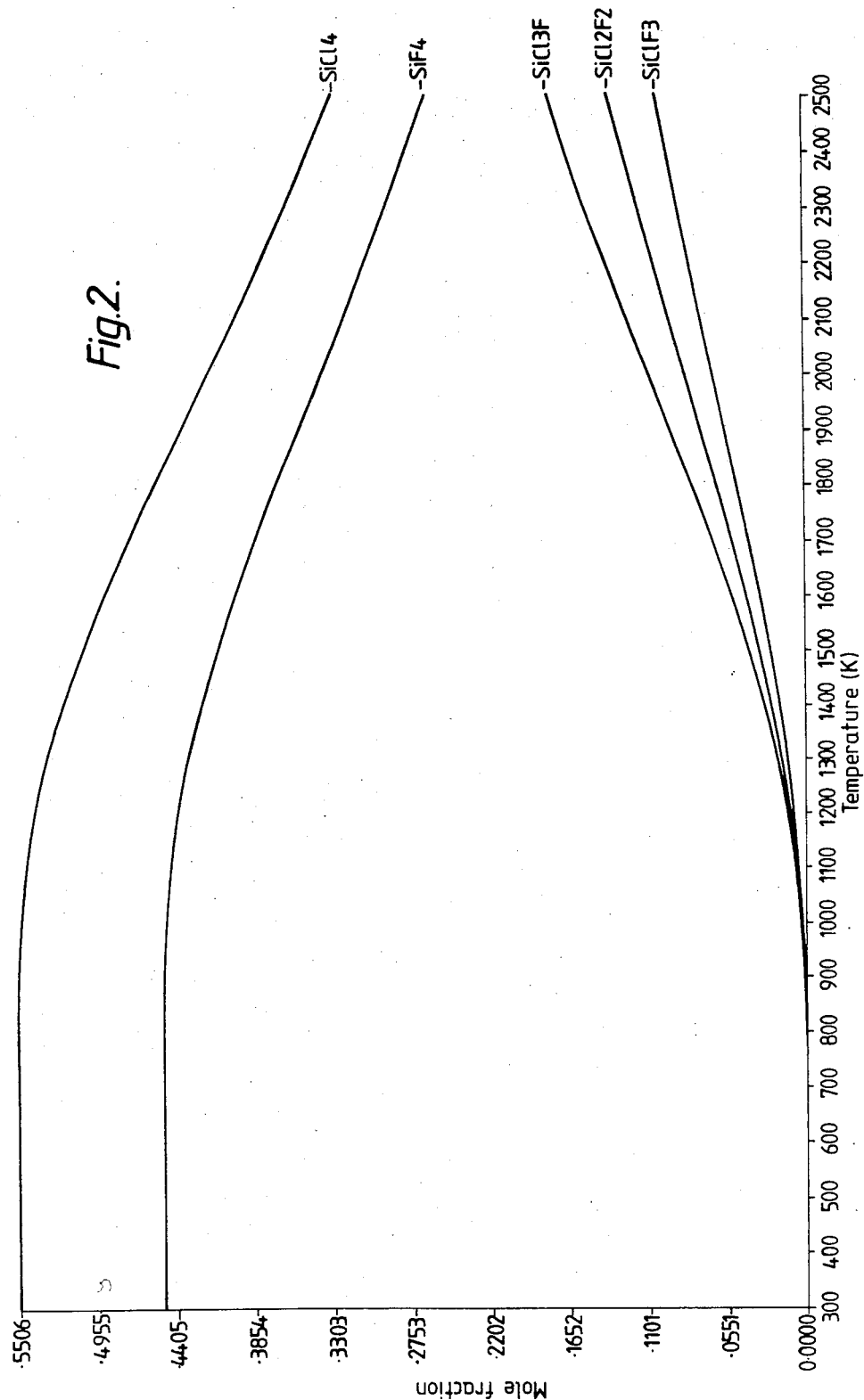
FIG. 2 illustrates the equilibrium composition of various components of the reactant vapours in terms of variations in mole fraction with temperature.
Figure 3:
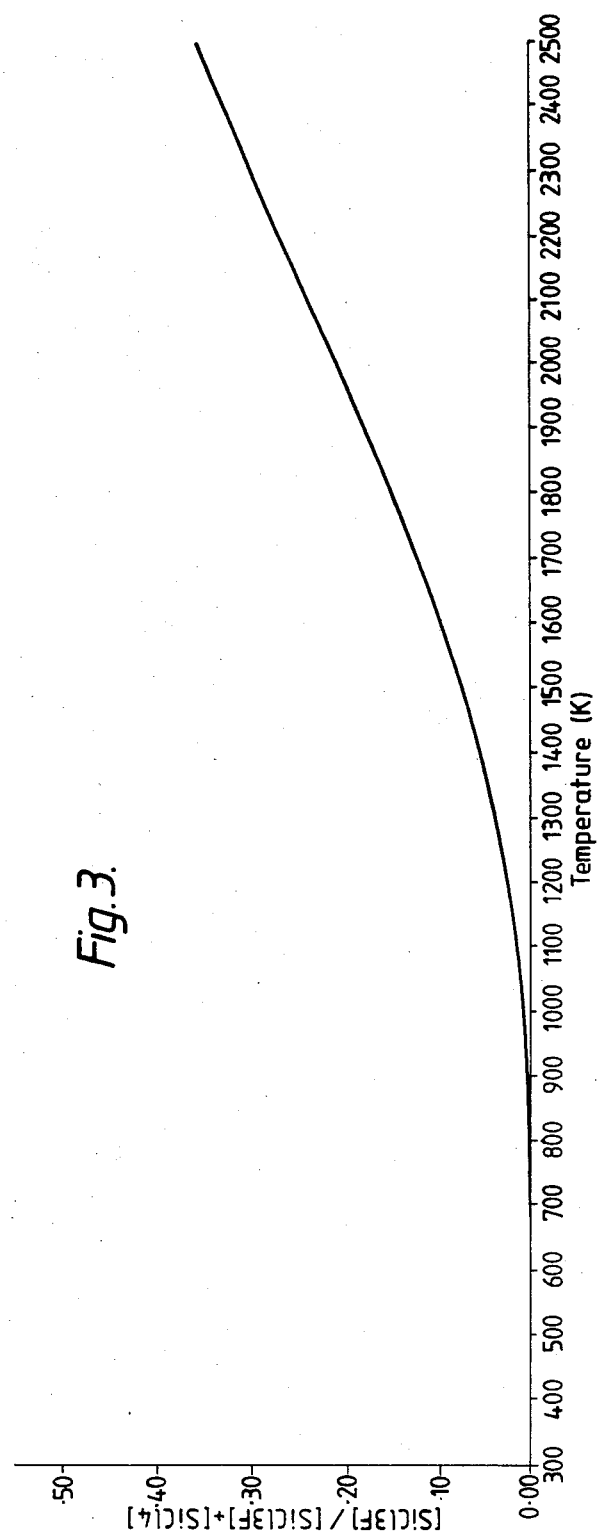
FIG. 3 illustrates the variation in the relative concentration of the fluorinating species 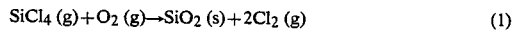 [$(SiCl_3F)/(SiCl_3F+SiCl_4)$] with temperature.

In considering a process where $SiCl_4$ and a fluorinating agent are progressively heated from ambient temperatures in the presence of oxygen and if reaction (2) follows similar kinetics to reaction (1) as above, therefore, no fluorine exchange would be possible above 1200° C. ($\simeq 1500K$) because no suitable silicon chloride species would be available for reaction. This implies that the ratio of $SiCl_3F:SiCl_4$ in the gas phase, at the temperature at which the oxidation reaction occurs, determines the ratio of the $SiO_{1.5}F:SiO_2$ in the deposited glass. FIG. 2 shows the actual proportions of the chlorofluorosilanes ($SiCl_{4-n}F_n$) at different temperatures temperature from 300 to 2500K. It can be seen that the ratio of $SiCl_3F:SiCl_4$ increases with increasing temperature. This is shown more clearly in FIG. 3 which shows the proportion of $SiO_{1.5}F$ which would be incorporated into the glass at each temperature. It is assumed that only $SiCl_3F$ and $SiCl_4$ react with oxygen to form the glass and that the ratio of these gives the ratio of $SiO_{1.5}F$ and $SiO_2$ in the deposited glass, the amount of fluorine in the glass being directly proportional to the refractive index depression $\Delta n$. As an illustration of FIG. 3, if one considers the oxidation reaction to be essentially complete at 1500K, from the graph the fraction of $SiO_{1.5}F$ in the glass would be approximately 0.07, whereas at 1800K the fraction would be approximately 0.15, that is a 300K temperature rise would double the fluorine incorporation. Hence if, for example, the oxidation reaction is delayed until the reactants reach a higher temperature than that at which oxidation occurs, exchange reactions between the $SiCl_4$ and the fluorinating agents may take place first and the proportion of fluorine in the deposit will be increased when oxidation is eventually permitted.

The oxidation reaction may be delayed in the internal tube process by arranging a feed tube inside the substrate tube and progressively moving the feed tube with the torch heating the substrate tube. This arrangement is shown schematically in FIG. 4. The substrate tube 1 is heated by a flame (indicated by arrow 2) from a torch (not shown) whereby to heat the substrate tube 1 on both sides axially of the end of a feed tube 3. Oxygen is passed down the feed tube 3 and the other reactants gases ($SiCl_4$ plus fluorinating reagent), with or without an inert carrier gas, are passed between the feed tube 3 and the substrate tube 1. The feed tube 3 is positioned so that the oxygen only mixes with the other reactant gases in the heated region, typically at temperatures of 1500°–1600° C. ($\simeq 1800-1900K$) and reacts in reaction zone 4. The gas flows may be exchanged i.e. the oxygen may flow between the substrate tube and the feed tube with the reactant gases fed down the feed tube.

The method of increasing fluorine incorporation is not restricted to the internal tube process and is applicable to other optical fibre processes whereby the oxidation reaction is prevented until a higher temperature than would normally be the case in order to allow exchange reactions to occur first. Similarly the technique is not restricted to fluorine doping of silica glasses since other dopants may be similarly incorporated by a process involving an oxidation reaction of silicon tetrachloride, which oxidation reaction is prevented from proceeding until a temperature higher than would normally be the case in order to allow exchange reactions with other reactants to occur, for the purpose of producing doped silica glasses of compositions not allowed by thermodynamic considerations at the lower normal temperature. Whereas the manufacture of optical fibres is described, the glass need not be in, or intended after further processing, to be in, optical fibre form, the low refractive index glass provided by the incorporation of fluorine in silica also being of use in other optical components.

Figure 4:
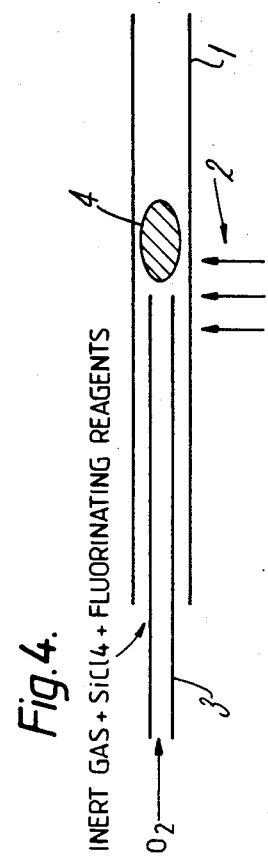
FIG. 4 illustrates schematically an inside tube vapour phase deposition process according to the present invention.

Whereas the method of fluorine incorporation in silica described above generates larger than usual quantities of $SiCl_3F$ in situ and immediately prior to the oxidation reaction, alternatively the silicon tetrachloride and a fluorinating agent may be preheated, to a temperature higher than required for the oxidation reactions in an inert gas, prior to direction into the substrate tube, the feed tube not being necessary in this case, in order to promote chemical exchange and produce $SiCl_3F$ for direction to the reaction zone where it reacts with oxygen also directed into the substrate tube, rather than production just before it as described with respect to FIG. 4, the oxidation reaction thus being prevented from occurring until larger quantities than usual of $SiCl_3F$ are present than those which normally occur whereby to increase the fluorine dopant level in the deposited silica.

I claim:

1. A thermally initiated vapor phase deposition process for the production of fluorine doped silica for optical fibre, comprising the steps of heating silicon tetrachloride together with a fluorinating agent to a first temperature whereby to produce an exchange reaction therebetween, the reactant vapors resulting from the exchange reaction including silicon tetrachloride and silicon trichlorofluoride (SiCl$_3$F), the ratio of silicon trichlorofluoride to silicon trichlorofluoride and silicon tetrachloride in said reactant vapors increasing with said increasing values of said first temperature, and subsequently to said exchange reaction combining oxygen with said reactant vapors to cause an oxidation reaction to occur to produce fluorine doped silica comprising a mixed oxide of silica and SiO$_{1.5}$F, which oxidation reaction can go to completion at a second temperature that is lower than the first temperature, the use of the first temperature for the exchange reaction which is higher than the second temperature needed for the oxidation reaction to go to completion causing the production of higher quantities of silicon trichlorofluoride than if the exchange reaction is carried out at the second temperature and causing increased fluorine dopant levels in the produced fluorine doped silica.

2. A process as claimed in claim 1, wherein the fluorinating agent is selected from the group consisting of SiF$_4$, CF$_2$Cl$_2$, CF$_4$, SF$_6$ and BF$_3$.

3. A process as claimed in claim 1, wherein the silicon tetrachloride and the fluorinating agent are heated to said first temperature together with an inert gas in order to promote the exchange reaction.

* * * * *